\*- Zinc Dibutyl Dithiocarbamate
\*\*- Zinc Dimethyl Dithiocarbamate

\*\*- Bismuth Dimethyl Dithiocarbamate

***-Zinc Diethyl Dithiocarbamate

United States Patent Office 3,828,004
Patented Aug. 6, 1974

3,828,004
STABILIZATION OF POLYMERS OF UNSATURATED HYDROCARBONS
Richard J. Dauksys, Bellbrook, Ohio
(49 Nuthatch Knob Road, Glastonbrook, Conn. 06033)
No Drawing. Filed Apr. 2, 1973, Ser. No. 347,243
Int. Cl. C08f 45/56
U.S. Cl. 260—45.75 R        7 Claims

ABSTRACT OF THE DISCLOSURE

The ultraviolet light stability of polymers of unsaturated hydrocarbons is improved by immersing the polymers in a solution of osmium tetroxide and sodium iodate. After exposure to ultraviolet light, the polymers so treated retain their mechanical properties to a substantial degree, and crazing or cracking of the polymers is virtually eliminated.

RIGHTS OF THE GOVERNMENT

Figure 1:
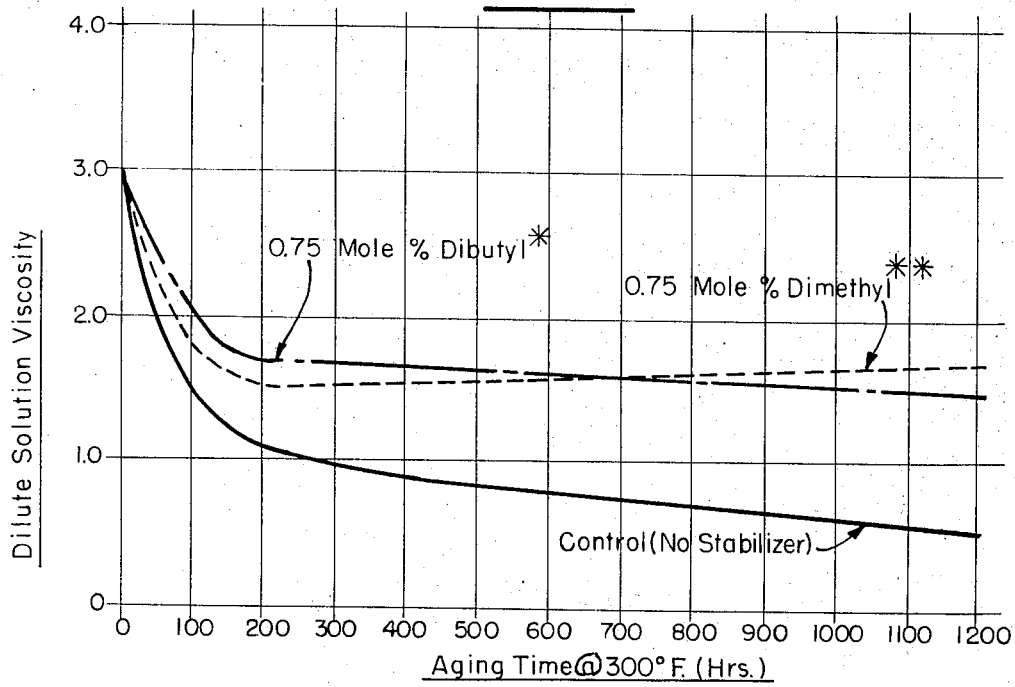
Figure 3:
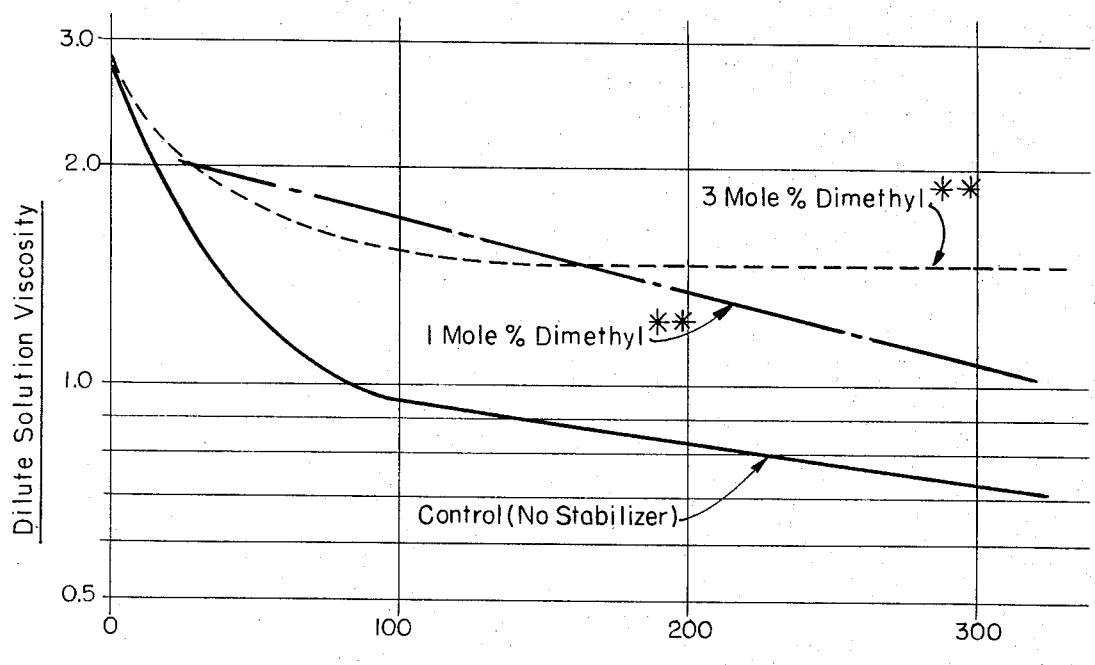
Figure 2:
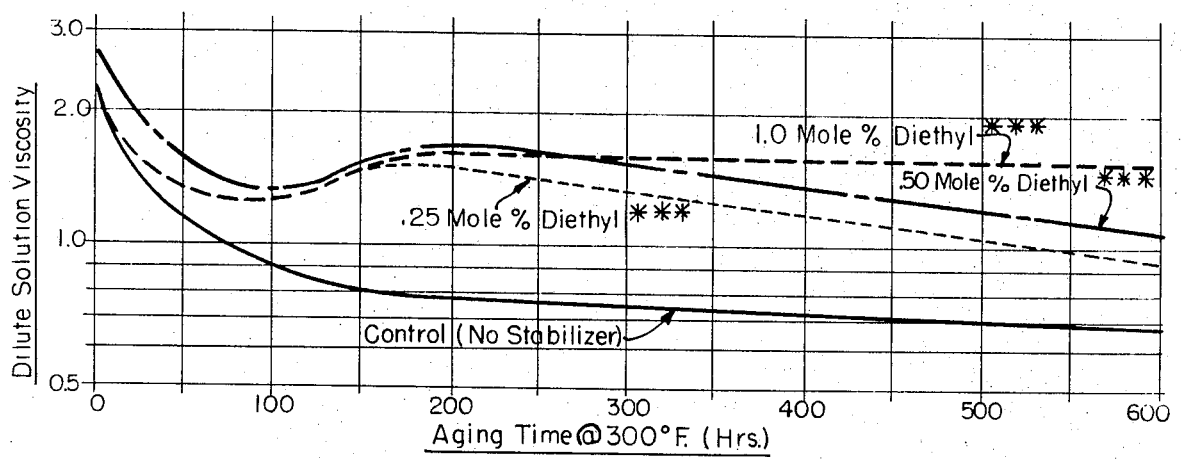
Figure 4:
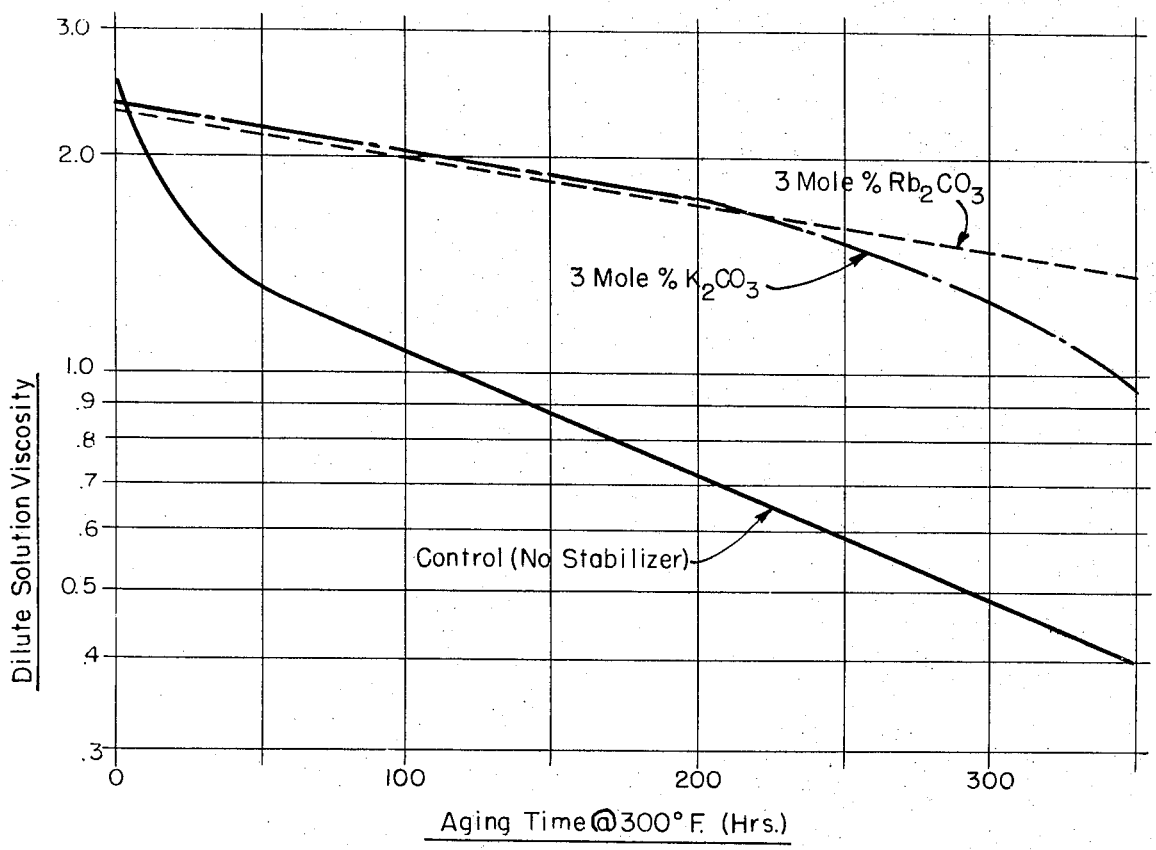

The Government of the United States has a nonexclusive, irrevocable, royalty-free license in the invention described herein with power to grant licenses for all governmental purposes.

FIELD OF THE INVENTION

This invention relates to a process for stabilizing polymers of unsaturated hydrocarbons against degradation by ultraviolet radiation. In one aspect it relates to stabilized polymers of unsaturated hydrocarbons, particularly homopolymers and copolymers of ethylene and propylene.

BACKGROUND OF THE INVENTION

Polmers of unsaturated hydrocarbons, such as ethylene and propylene, are susceptible to degradation when exposed to light. The degradation is especially severe when the polymers are subjected to exposure to light in the ultraviolet portion of the spectrum. The degradation that occurs generally results in the loss of tensile strength and other physical properties and in cracking or crazing caused by embrittlement. A variety of materials, e.g., titanium dioxide, carbon black, and mixtures of dithiocarbomates, are disclosed in the prior art as being suitable for stabilizing polyethylene or polypropylene against degradation by ultraviolet light. When utilizing such stabilizing ingredients they are usually admixed with the melted polymer, for example, by milling on heated rolls or by employing a Banbury mixer. This procedure is carried out prior to the fabrication of the desired article by molding, extrusion or other suitable method.

It is an object of this invention to provide a new and simplified procedure for stabilizing polymers against degradation by ultraviolet light.

Another object of the invention is to provide a process for stabilizing polymers that does not require the mixing step of the prior art processes whereby stabilizing agents are incorporated into the polymers.

A further object of the invention is to provide a process whereby articles fabricated from hydrocarbon polymers can be stabilized subsequent to their fabrication.

Other objects and advantages of the invention will become apparent to those skilled in the art upon consideration of the accompanying disclosure.

SUMMARY OF THE INVENTION

Broadly speaking, the present invention resides in a process for stabilizing a solid hydrocarbon polymer against degradation by ultraviolet light whereby the polymer is immersed in a bath comprising a solution of osmium tetroxide. It has been discovered that treatment of the polymer in this manner results in a product which retains its physical properties and is not subject to cracking after exposure to ultraviolet light. The mechanism whereby the polymer is stabilized is not completely understood. While it is not intended to limit the invention to any particular theory, it is believed that the osmium tetroxide permeates the polymer by diffusion, causing cleavage of terminal carbon to carbon double bonds, which are susceptible to ultraviolet light. Thus, osmate ester groups are formed that are much less subject to ultraviolet light degradation.

In a particularly preferred embodiment of the invention, the hydrocarbon polymer is immersed in a bath comprising a solution of osmium tetroxide and sodium iodate. The inclusion of the sodium iodate constitutes an important aspect of the invention. Thus, osmium tetroxide reduced to osmium dioxide or osmium metal during the process is oxidized to its original $OsO_4$ oxidation state as a result of the sodium iodate functioning as an oxidizing agent. A regenerative process is thereby provided, enabling a solution to be used over long periods of time without adding more of the osmium tetroxide. In view of the high cost of the osmium compound, this embodiment of the invention is important from an economic as well as from an operational standpoint.

The process of this invention is, in general, applicable to the stabilization of polymers of unsaturated hydrocarbons against degradation caused by exposure to ultraviolet light. Examples of such polymers include polymers of $\alpha$-olefins, preferably containing 2 to 4, inclusive, carbon atoms, and of conjugated dienes, preferably containing 4 to 6, inclusive, carbon atoms. Homopolymers as well as copolymers of $\alpha$-olefins and conjugated dienes can be treated in accordance with the process of this invention. Exemplary of such polymers are polyethylenes, polypropylenes, polyisobutylenes, ethylene-propylene copolymers, polybutadienes, polyisoprenes, butadiene-styrene copolymers, and the like. Such polymers are well known, and various methods for their preparation are described in the literature.

In carrying out the process of this invention, the osmium tetroxide is dissolved in a solvent therefor. Examples of solvents that can be used include ethyl ether, pyridine, and dioxane. It is usually preferred to utilize dioxane as the solvent. The amount of osmium tetroxide added to the solvent is usually in the range of about 0.055 to 1.0 gram per liter of solution.

When proceeding in accordance with the preferred embodiment of the invention, the preferred procedure in preparing the bath is to dissolve the sodium iodate in water. The resulting solution is then added to the solution of osmium tetroxide while stirring. The result is a homogenous solution of osmium tetroxide and sodium iodate since water, the solvent for sodium iodate, is miscible with the solvent for the osmium tetroxide. The homogeneous solution so prepared usually consists essentially of about 5 to 95 volume percent water and 95 to 5 volume percent solvent for osmium tetroxide having dissolved therein about 0.05 to 1.0 gram of osmium tetroxide and about 15 to 200, preferably 25 to 75, grams of sodium iodate per liter of solution.

The polymer to be stabilized is immersed in the solution for a period of about 5 minutes to 5 hours, preferably from about .5 to 1.5 hours. During the period of immersion, the solution is maintained at a temperature in the range of about 20 to 100° C.

The process of this invention is particularly applicable to stabilizing articles fabricated from hydrocarbon polymers. Such articles include polymeric sheets or film, castings, compression or injection molded items, and extruded items such as fibers and rod stock.

A more complete understanding of the invention can be obtained by referring to the following illustrative example which is not intended, however, to be unduly limitative of the invention.

EXAMPLE

A series of runs was conducted in which polyethylene and polypropylene were stabilized against degradation by ultraviolet light in accordance with the process of this invention. The solution used in the runs contained the following components in the indicated amounts:

| | | |
|---|---|---|
| $OsO_4$ | g | 0.3 |
| $NaIO_4$ | g | 30.0 |
| Dioxane | mls | 240 |
| Water | mls | 310 |

A homogeneous solution was prepared by dissolving the $OsO_4$ in the dioxane after which the $NaIO_4$ dissolved in the water was added thereto while stirring. Specimens of polyethylene and polypropylene were immersed in the solution, maintained generally at a temperature of 85–87° C., for periods of time ranging from 1 to 4 hours. The specimens were "dog-bone" tensile specimens which had been stamped from sheets of polyethylene and polypropylene using a metal die.

At the end of the immersion time, the specimens were dried and then exposed to ultraviolet light for a period of 200 hours. The ultraviolet light exposure was conducted in an Atlas Weather Ometer (Model XW). Distance of the specimens from the ultraviolet source generated by carbon electrodes was 14 inches.

Control runs were also carried out in which untreated specimens were exposed to ultraviolet light in the manner described in the preceding paragraph.

The tensile strength of the treated and untreated specimens was determined, using an Instron Universal Testing Machine. Specimen width in the gage section was 0.25 inch and the gage length was 1 inch. The method of ASTM D638–60T was used as a guide in the testing procedure.

The results of the tests as well as information concerning conditions of the runs are shown hereinafter in the table.

TABLE

| Condition of specimen [1] | Immersion time, hrs. | Solution temp., °C. | Age of solution, hrs. | Percent retention, tensile load | |
|---|---|---|---|---|---|
| | | | | Polyethylene | Polypropylene |
| A [2] | | | | 75 | 69 |
| B | 1.5 | 85–87 | 47.5 | 94 | |
| B | 1.5 | 85–87 | 50 | 99 | 94 |
| B | 1.0 | 85–87 | 51.25 | 87 | 92 |
| B | 1.5 | 85–87 | 69.5 | 90 | 94 |
| B | 1.5 | 85–87 | 189 | 91 | 94 |
| B | 4.0 | 85–87 | 193 | 90 | 94 |
| B | 2.0 | 85–87 | 240 | 90 | 96 |
| B | 1.0 | 85–87 | 216 | 87 | 92 |

[1] A = Untreated, U.V. exposed for 200 hrs.; B = treated, U.V. exposed for 200 hrs.
[2] Control runs.

From the data in the foregoing table, it is seen that the untreated specimens of polyethylene and polypropylene lost from about 25 to 30 percent of their original tensile strength when exposed to ultraviolet light for 200 hours. On the other hand, the specimens that were treated in accordance with the process of this invention underwent a loss in tensile strength of only 6 to 10 percent. Furthermore, the data indicate that the solution is effective after long periods of time. The treated specimens did not show any evidence of crazing as did the untreated specimens.

As will be evident to those skilled in the art, various modifications of the invention can be made or followed in view of the foregoing disclosure without departing from the spirit or scope of the invention.

I claim:

1. A composition comprising a solid polymer of an unsaturated hydrocarbon stabilized against degradation by ultraviolet light which stabilized polymer is prepared by the method of affecting stabilization which comprises immersing the polymer in a solution comprising osmium tetroxide and a solvent therefor selected from the group consisting of dioxane, ethyl ether and pyridine, the solution being at a temperature ranging from about 20 to 100° C., and the solution containing about 0.05 to 1.0 gram of osmium tetroxide per liter of solution; and maintaining the polymer immersed in the solution for a period of about 5 minutes to 5 hours.

2. The composition according to claim 1 in which the polymer is immersed in the solution for a period of about 0.5 to 1.5 hours.

3. The composition according to claim 1 in which the polymer is polyethylene, polypropylene, or a copolymer of ethylene and propylene.

4. The composition according to claim 1 in which the solution is a homogeneous solution consisting essentially of the osmium tetroxide, the solvent for the osmium tetroxide, sodium iodate and water, the water being miscible with the solvent and said sodium iodate being present in an amount sufficient to regenerate the osmium tetroxide.

5. The composition according to claim 4 in which the homogeneous solution consists essentially of 5 to 95 volume percent water and 95 to 5 volume percent solvent for the osmium tetroxide having dissolved therein about 0.05 to 1.0 gram of osmium tetroxide and about 15 to 200 grams of sodium iodate, each amount being based on one liter of solution.

6. The composition according to claim 5 in which the amount of sodium iodate is in the range of about 25 to 75 grams per liter of solution.

7. The composition according to claim 5 in which the polymer is polyethylene, polypropylene, or a copolymer of ethylene and propylene.

References Cited

UNITED STATES PATENTS

| | | | |
|---|---|---|---|
| 3,111,533 | 11/1963 | Ecke | 200—45.75 |
| 3,117,148 | 1/1964 | Ihrman et al. | 260—45.75 |
| 3,313,835 | 4/1967 | Wilkus et al. | 260—45.75 |
| 3,309,219 | 3/1967 | Etherington | 252—300 |

OTHER REFERENCES

Journal of Organic Chemistry—vol. 21, No. 4, April 1956, pp. 478 and 479.

Plastics and Polymers—June 1968, pp. 195 to 203.

V. P. HOKE, Primary Examiner